Aug. 21, 1962  K. H. LIEDBERG ETAL  3,049,805
DENTAL APPARATUS
Filed Sept. 24, 1957

INVENTOR
BY
ATTORNEY

United States Patent Office 3,049,805
Patented Aug. 21, 1962

3,049,805
DENTAL APPARATUS
Kurt Herman Liedberg, Skara, and Stig Rune Zernell, Johanneshov, Sweden, assignors to Atlas Copco Aktiebolag, Nacka, Sweden, a corporation of Sweden
Filed Sept. 24, 1957, Ser. No. 685,921
3 Claims. (Cl. 32—22)

This invention relates to dental apparatus, particularly engine stands adapted for supporting one or more dental engines or the like and to contain power supply means and controls and other devices which are deemed valuable in order to relieve the operator of a dental engine or engines or the like from various secondary measures or operations. The invention also relates to mechanisms incorporated in such stands and capable of being used for other purposes also. One object of the invention is to provide an improved dental engine stand in which power is supplied to the dental engine as soon as said engine has been removed from a holder in the stand. A further object of the invention is to provide a dental engine stand for pressure fluid operated dental engines in which pressure fluid of a desired pressure is supplied to the dental engine through a hose leading to the dental engine only upon removal of the dental engine from the stand. A further object of the invention is to provide a dental engine stand for two or more dental engines in which cooling or spraying liquid is supplied adjacent to the tool driven by the dental engine when the dental engine is started. A still further object of the invention is to provide a dental engine stand in which a plastic hose may be used to conduct pressure fluid from the stand to the dental engine or engines and in which such hose is subjected to pressure only when the dental engine has been removed from the stand. A still further object of the invention is to provide a device by means of which spray liquid or cooling liquid is supplied to the stand in response to a very small drop in pressure in a pressure fluid supply conduit.

Figure 1:
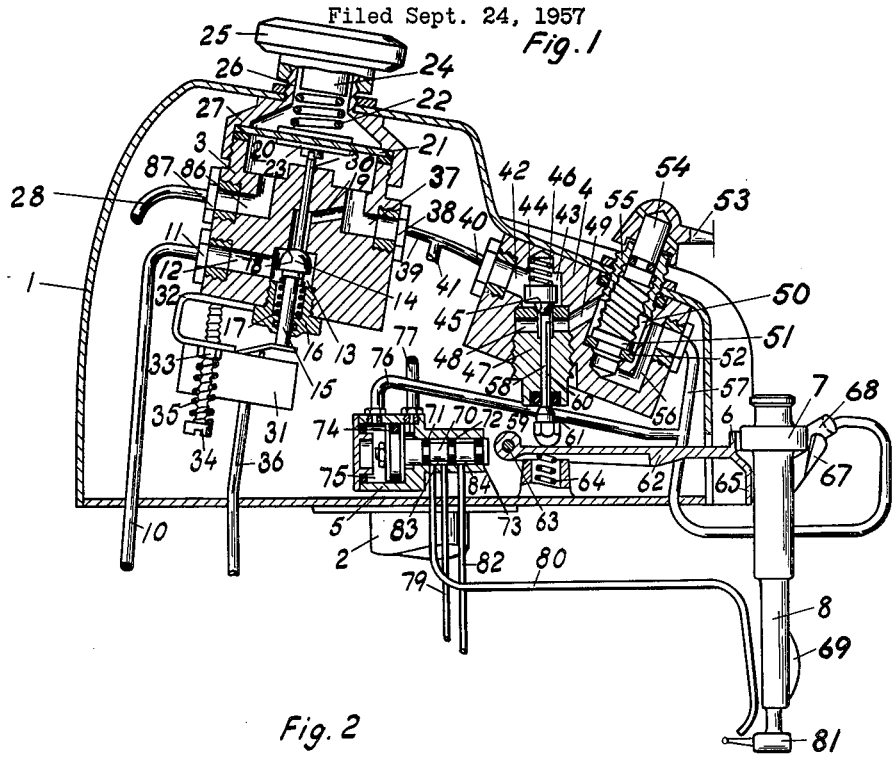
Figure 2:
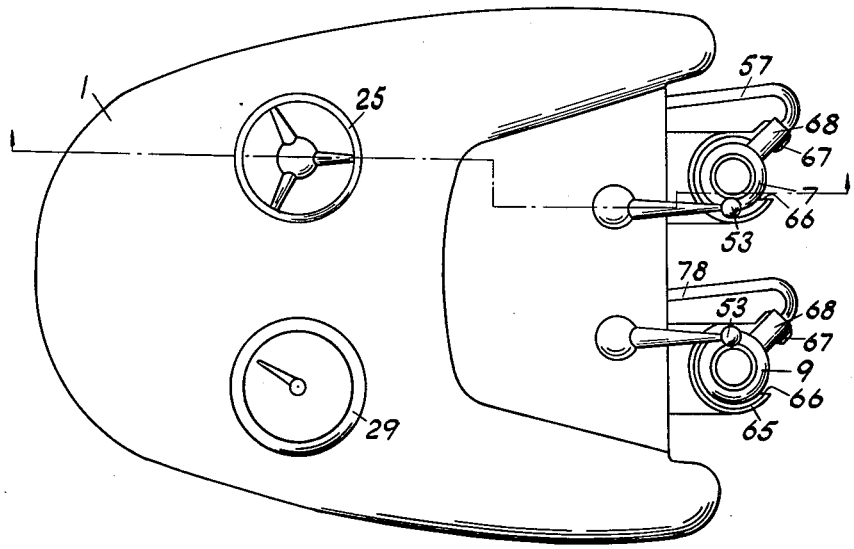

In the drawings a dental engine stand according to the invention is illustrated by way of example. FIG. 1 is a vertical cross section through a dental engine stand for two dental engines according to the invention and FIG. 2 is a view from above of the dental engine stand according to FIG. 1.

The dental engine stand illustrated in the drawing consists of a casing 1 which may be carried on a post 2 or a bracket extending from a wall or from the conventional dental units which carry the various tools and accessories used by a dentist or in other suitable way. The illustrated dental stand is adapted for use in connection with pressure fluid driven dental engines and particularly for use in connection with compressed air driven dental engines but the invention is not limited to dental engine stands for such engines and may in part be used in connection with pressure liquid driven or electrically driven dental engines.

The casing 1 ocntains a fluid pressure reduction valve device 3 and for each dental engine an automatic valve device 4. Furthermore, the casing contains a distributor valve device 5 for cooling or spraying liquid. In the front portion of the casing 1 a holder 6 is provided for each dental engine 7 and 9, respectively. The dental engines 7, 9 may be of the type described in the assignee's copending application Ser. No. 566,654, filed February 20, 1956, now Patent No. 2,855,671 granted October 14, 1958, to Karl Ivar Lundgren, et. al., but the dental engine stands according to the invention are of course not limited to the use of dental engines of this type. One of the dental engines 7 may preferably be a dental engine having a straight hand-piece 8, as illustrated in FIG. 1, and the other dental engine 9 may preferably have a contra-angle hand-piece (not illustrated).

The dental engine stand illustrated in the drawing is supplied with compressed air from a suitable compressor through a hose 10 which is connected by a bushing 11 to the pressure reduction valve device 3 in which the compressed air is conveyed from the bushing 11 and a passage 12 to a space 13 containing a valve member 14. The valve member 14 has a spindle 15 which projects through a bushing 16, and a spring 17 is disposed in a recess in said bushing and tends to move the valve member 14 against a valve seat 18. From the space 13 a passage 19 extends to a chamber 20 which is covered by a membrane bellows 21 loaded by a helical spring 22 which is interposed between a central disc 23 on the membrane bellows 21 and a spindle 24 carried by a hand wheel 25 which is screw-threaded on a portion 26 of a cover 27 for the chamber 20. By means of the hand wheel 25 the tension of the spring 22 may be adjusted and consequently also the pressure in the chamber 20. When no air is taken away from the chamber 20 the spring 22 and the air pressure in chamber 20 acting on valve member 14 balances the air pressure on bellows 21 in chamber 20 and on valve 14 in space 13 and the tension of spring 17. A pressure drop in chamber 20 caused by air being taken from said chamber causes the spring 22 to open valve member 14 to admit air from space 13 to chamber 20.

A passage 86 leads from the chamber 20 through a bushing 87 and a hose 28 to a gauge 29 which indicates the pressure in the chamber 20. A pin 30 is movable in the valve device and inserted between the valve member 14 and the disc 23. At the bottom of the valve device 3 a standard electrical micro-switch 31 is carried by a U-shaped spring 32. A nut 33 is welded or soldered to one member of the U-shaped spring 32 carrying the micro-switch 31, whereas the other member of the U-shaped spring is secured to the valve device 3. A set screw 34 extends through the nut 33 and may be used to set the distance between the microswitch 31 and the spindle 15. A helical spring 35 is interposed between the head of the set screw 34 and the spring 32 or nut 33. An electrical cable 36 leads from the micro switch 31 to a device (not illustrated) including an electrically operated valve which upon energization opens the supply of spray or cooling liquid to the stand from a source of cooling or spray liquid. A passage 37 leads from the chamber 20 through a bushing 38 to a hose 39 which has two branches 40 and 41 leading each per se to an automatic valve device 4.

The automatic valve device 4 has an inlet passage 42 leading to a valve chamber 43 in which a valve member 44 is disposed and pressed against a seat 45 by a spring 46. The seat 45 is formed in a plug 47 which has a transverse passage 48 communicating through a passage 49 with a space 50 in which a hand operated valve member 51 is disposed and movable against a seat 52 by means of a handle 53 provided on a spindle 54 which is screw-threaded in a bushing 55 and carries the valve member 51. From the space 50 a passage 56 leads to a hose 57 which is connected to the dental engine 7. The dental engine 9 is connected in a similar way to a second automatic valve device 4. The plug 47 contains a spindle 58 which extends through a sealing ring 59 in the bushing and has a passage 60 and carries a valve member 61. The passage 60 communicates in all positions of the spindle 58 with the passage 48 and the valve member 61 is normally in the position illustrated in FIG. 1 in which the valve member 61 is lifted from the sealing ring 59 so that the passage 48 is vented to the atmosphere through the passage 60.

The dental engine holder 6 is carried on the extreme end of an arm 62 which is pivotally mounted on a pin 63 and rests on a spring 64 which is compressed by the arm 62 when the holder 6 is loaded by the weight of the dental engine 7 provided in the holder. As soon as the dental engine 7 is lifted out of the holder 6 the spring 64 lifts the arm 62 and moves the valve member 61 upwardly so that the valve member 61 closes the vent passage 60 and lifts the valve member 44 from the seat 45 thereby admitting compressed air of reduced pressure from the pressure reduction valve device 3 to the space 50. If the operator has opened the valve member 51 compressed air of reduced pressure is admitted to the dental engine through the hose 57.

The holder 6 at the forward end of the lever 62 forms a socket 65 which is recessed at 66 to receive the dental engine 7 or 9 and has a guide lip 67 for receiving a boss 68 on the dental engines through which the hose 57 is connected so that the dental engines will have a fixed and steady position in the holder 6 and still be very easy to remove therefrom and to slip into the holder in a natural way.

The distributing valve device 5 is provided on the base plate of casing 1 and has a slide valve member 70 which carries three sealing rings 71, 72, 73 and a piston head 74 operable in a chamber 75. A hose 76 which is branched off from the hose 57 leading to the dental engine 7 is connected to one end of the chamber 75 and a hose 77 which is branched off from a hose 78 leading to the dental engine 9 from the second valve device 4 pertaining to the dental engine 9 and of the same construction as the valve device 4 provided for the dental engine 7 is connected to the opposite end of the chamber 75. The distributor valve device 5 is connected to a container (not illustrated) for spraying or cooling liquid through the hose 79 and a hose 80 leads from the distributing valve device 5 to the tool head 81 of the hand piece 8 and opens adjacent to the bur or drill or other tool. A second hose 82 leads from the distributor valve device 5 to the tool head of the dental engine 9 in a similar way as the hose 80. It will be appreciated that when, for instance, the dental engine 7 is removed from its holder and started a sudden pressure drop will occur in the chamber 20. When the dental engine 7 is removed from its holder with valve member 51 in open air position compressed air is admitted to the hose 57 and consequently also to the hose 76 so that the piston 74 is moved to the position illustrated in FIG. 1. Cooling or spraying liquid passage is then open from the hose 79 through a space 83 in the distributing valve device 5 to the hose 80 whereas communication from the hose 79 to the hose 82 through a space 84 is interrupted. When the operator presses the spring 69 on the dental engine air is admitted to the engine motor and the tool is rotated. The air consumption of the dental engine 7 causes a pressure drop in the hoses and passages from the dental engine 7 back to the chamber 20 in the reduction valve device 3. This very little pressure drop results in a slight movement of the membrane bellows 21 against the spindle 30 and the valve member 14 the stem 15 of which operates the micro-switch 31 which is connected through the cable 36 to a conventional electro-magnetically operated valve provided in the outlet from the cooling liquid or spray liquid container so that cooling or spraying liquid is now supplied from the container through the hose 79, space 83 and hose 80 to the tool. As soon as the operator releases the pressure on the trigger 69 the pressure drop in the chamber 20 is eliminated and the micro-switch shuts the electro-magnetically operated valve so that the flow of cooling or spraying liquid to the tool is interrupted. It is obvious that spraying liquid or cooling liquid is only supplied to the tool when the operator runs the dental engine at a certain load. A suitable switch (not illustrated) in the cable 36 may be used to cut out the operation of the micro-switch 31 when it is desired to operate the tool dry.

It is obvious that the control of the spraying or cooling liquid to the tool above described may be used in connection with dental engines operating on compressed air or on liquid or other pressure fluid. It should also be noted that the arrangement for operating the micro-switch by a pressure drop in a chamber 20 in a reduction valve device 3 may be employed for various other purposes than dental engines. It should also be noted that the dental engine stand hereinabove described is only an example which does not limit the scope of the invention as set forth in the appended claims. Dental engine stands according to the invention may be provided for a single dental engine and for two or more dental engines as the need may be. It should also be understood that dental engine stands and the dental engines may be used for purposes other than dental purposes, for instance for chirurgical operations and other purposes.

What we claim is:

1. A dental apparatus comprising a casing, a dental engine holder movably mounted in said casing and formed to receive a dental engine, a pressure fluid supply means in said casing, a dental engine comprising a hand-piece and a pressure fluid operated motor, said dental engine being received in said holder when in inoperative position, a control valve connected to said fluid supply means, a conduit connecting said valve and said motor, and means providing an operative connection between said valve and said holder for operating said valve upon movement of said holder as the result of removing said dental engine from said holder for admitting pressure fluid to said dental engine.

2. A dental apparatus comprising a casing, a dental engine holder movably mounted in said casing and formed to receive a dental engine, a power supply means in said casing, a dental engine comprising a hand-piece and a motor, said dental engine being received in said holder when in inoperative position, power control means in said casing connected to said supply means, power conducting means connecting said motor to said power control means, means providing an operative connection between said control means and said holder and operable upon movement of said holder as the result of removing said dental engine from said holder for admitting power to said power conducting means, and an operating means on said hand-piece for controlling the power supply from said power conducting means to said motor.

3. A dental apparatus comprising a casing, a dental engine holder movably mounted in said casing and formed to receive a dental engine, a pressure fluid supply means in said casing, a dental engine comprising a hand-piece and a pressure fluid operated motor, said dental engine being received in said holder when in inoperative position, a control valve connected to said fluid supply means, a conduit connecting said valve and said motor, means providing an operative connection between said valve and said holder for operating said valve upon movement of said holder and as the result of removing said dental engine from said holder for admitting pressure fluid to said dental engine, and means in said casing for supplying cooling or spraying fluid to said dental engine, said last named means being operable to deliver such cooling or spraying fluid in response to operation of the motor of the dental engine.

References Cited in the file of this patent

UNITED STATES PATENTS

| | | |
|---|---|---|
| 2,343,620 | Pieper | Mar. 7, 1944 |
| 2,597,478 | Hammon | May 20, 1952 |
| 2,612,728 | Jacobsson | Oct. 7, 1952 |
| 2,715,272 | Pieper | Aug. 16, 1955 |